United States Patent
Quan et al.

(10) Patent No.: US 12,237,805 B2
(45) Date of Patent: Feb. 25, 2025

(54) BEARING FOR ROTATIONAL SHAFTS SUPPORTED BY SUPPORT PILLARS

(71) Applicant: TRINA SOLAR, S.L.U., Madrid (ES)

(72) Inventors: Peng Quan, Madrid (ES); Juan Manuel Gómez Garcia, Madrid (ES); Daniel González García, Madrid (ES); Jose Ignacio López Ayarza, Madrid (ES)

(73) Assignee: TRINA SOLAR SPAIN, S.L.U., Madrid (ES)

( * ) Notice: Subject to any disclaimer, the term of this patent is extended or adjusted under 35 U.S.C. 154(b) by 0 days.

(21) Appl. No.: 18/312,910

(22) Filed: May 5, 2023

(65) Prior Publication Data

US 2023/0387850 A1   Nov. 30, 2023

(30) Foreign Application Priority Data

May 24, 2022   (ES) .............................. ES202230858U

(51) Int. Cl.
*H02S 20/32*   (2014.01)
(52) U.S. Cl.
CPC .................................... *H02S 20/32* (2014.12)
(58) Field of Classification Search
CPC ............................... H02S 20/32; F24S 30/425
USPC ........................................................ 248/506
See application file for complete search history.

(56) References Cited

U.S. PATENT DOCUMENTS

| | | | |
|---|---|---|---|
| 10,972,045 B2 * | 4/2021 | Cherukupalli | F24S 30/425 |
| 11,300,979 B2 * | 4/2022 | Kesler | F24S 50/20 |
| 2022/0149773 A1 * | 5/2022 | Reznar | F16C 23/046 |
| 2023/0407908 A1 * | 12/2023 | Quan | F16C 23/045 |

FOREIGN PATENT DOCUMENTS

| | | | |
|---|---|---|---|
| ES | 1141282 U | * | 7/2015 |
| ES | 2651916 A1 | | 1/2018 |
| ES | 2709659 T3 | | 4/2019 |
| ES | 2776736 T3 | | 7/2020 |
| ES | 1277944 U | | 9/2021 |

* cited by examiner

*Primary Examiner* — Todd M Epps
(74) *Attorney, Agent, or Firm* — LUCAS & MERCANTI, LLP

(57) ABSTRACT

A bearing (1) for rotational shafts supported by support pillars, to establish the fastening between a rotational shaft (3) and support pillars (2), able to rotate freely, having a support (4) which is fixed to the support pillar (2), the support (4) being axially clamped between two component parts (6.1), (6.2) of a clamp (6), which determines a ring (7) that houses a ball joint (5), through which the rotational shaft (3) being fastened is arranged.

11 Claims, 2 Drawing Sheets

BEARING FOR ROTATIONAL SHAFTS SUPPORTED BY SUPPORT PILLARS

CROSS-REFERENCE TO RELATED APPLICATION

This application claims priority of Spanish Patent Application No. U202230858, filed May 24, 2022, the contents of which are incorporated herein by reference.

TECHNICAL FIELD

The present invention is related to the fastening of rotational shafts arranged on support pillars in applications such as the orientation shaft of solar trackers, providing a bearing for the rotational joining of said rotational shafts to the support pillars.

STATE OF THE ART

To date, most photovoltaic solar plants use active solar trackers, which means they incorporate photovoltaic module panels that rest on a metal framework which is supported, in the most basic case, by a support pillar, which has an active linear actuator, meaning it is actuated by a small motor causing it expand or contract in order to modify the exposure angle of the photovoltaic module panels following the sun path.

However, in large installations, the photovoltaic module panels of solar trackers are coupled to rotational shafts in large chains, requiring multiple support pillars with linear actuators, at least one of which must be active, the rest being slaves that move synchronously with the active linear actuator.

In any case, the support of the rotational shaft on each support pillar involves a bearing through which a rotational shaft passes in an assembly that allows for rotation in order to modify the orientation of the photovoltaic module panels.

In the state of the art, different types of assemblies are known for establishing the rotational joining of rotational shafts on support pillars, such as the solutions found in patent documents ES 2651916, ES 2709659, ES 2776736, ES 1141282 and ES 1277944, which all have a common drawback in that they comprise a large number of elements that make the assembly and disassembly of the system difficult, in addition to the fact that some of these elements have complex designs, making the manufacturing thereof more expensive.

Specifically, the solutions in patent documents ES 2651916 and ES 2709659 have problems with adaptability to different types of support pillars, such as those with different I-shaped and C-shaped cross sections. Likewise, the range of loads that these solutions can support is small, which prevents them from being used in large applications.

Furthermore, some conventional solutions are not adaptable to different sections of the rotational shafts they must support, limiting use to a single section type of the rotational shaft. This leads to the drawback of having an uncompetitive product, therefore negatively affecting the benefits.

Additionally, some of the conventional solutions do not allow the elements thereof to be independently substituted since they are fixed to each other in a non-removable manner, forming an indivisible body.

Thus, the object of the present invention is to have a bearing that simplifies the manufacturing, assembly and maintenance thereof, and which is also versatile in that it can adapt to all types of rotational shafts.

OBJECT OF THE INVENTION

The object of the present invention is to eliminate the drawbacks and problems that occur in conventional fastening solutions for rotational shafts on support pillars, as well as to improve the functionality thereof for applications such as the orientation rotation of solar trackers, providing for said aims a bearing that comprises a smaller number of elements with a simple design that makes it easy to manufacture and assemble, saving in manufacturing and assembly costs.

The bearing object of the invention comprises a support that is fixed to the support pillar, said support being axially arranged clamped between two component parts or semi-parts that form a clamp, which determines a ring in which a ball joint is housed, through the which the rotational shaft (3) to be fastened is arranged.

In turn, the ball joint preferably comprises two complementary sections that determine a spherical outer surface, whereas in the inner part they define an opening for the passage of the rotational shaft of the application, the shape of said opening in correspondence with the section of the rotational shaft.

The bearing object of the invention is therefore adaptable to rotational shafts with different sections just by making the inner opening of the ball joint the shape corresponding to the section of the rotational shaft of the application, the application likewise being adaptable to different types of support pillars with different shapes and section sizes.

Furthermore, the bearing support is configured with a perpendicular wing on the perimeter edge thereof, which provides it with a resistance that makes the bearing able to withstand a greater range of loads, allowing it to be applied in large application installations.

In conclusion, the bearing object of the present invention provides a series of advantages that result in a better benefit-cost ratio.

DESCRIPTION OF THE FIGURES

In order to help provide a better understanding of the functionality of the proposed invention, drawings are attached, the character of which is non-limiting and merely illustrative.

DETAILED DESCRIPTION OF THE INVENTION

The present invention relates to a bearing (1) that is fixed to a support pillar (2) for supporting rotational shaft (3) for applications such as the rotational shaft (3) for the orientation of solar trackers or similar applications, wherein the rotational shaft (3) of the application passes through the bearing (1), thus being supported while also being able to rotate to perform the function for which it is intended.

Figure 1:
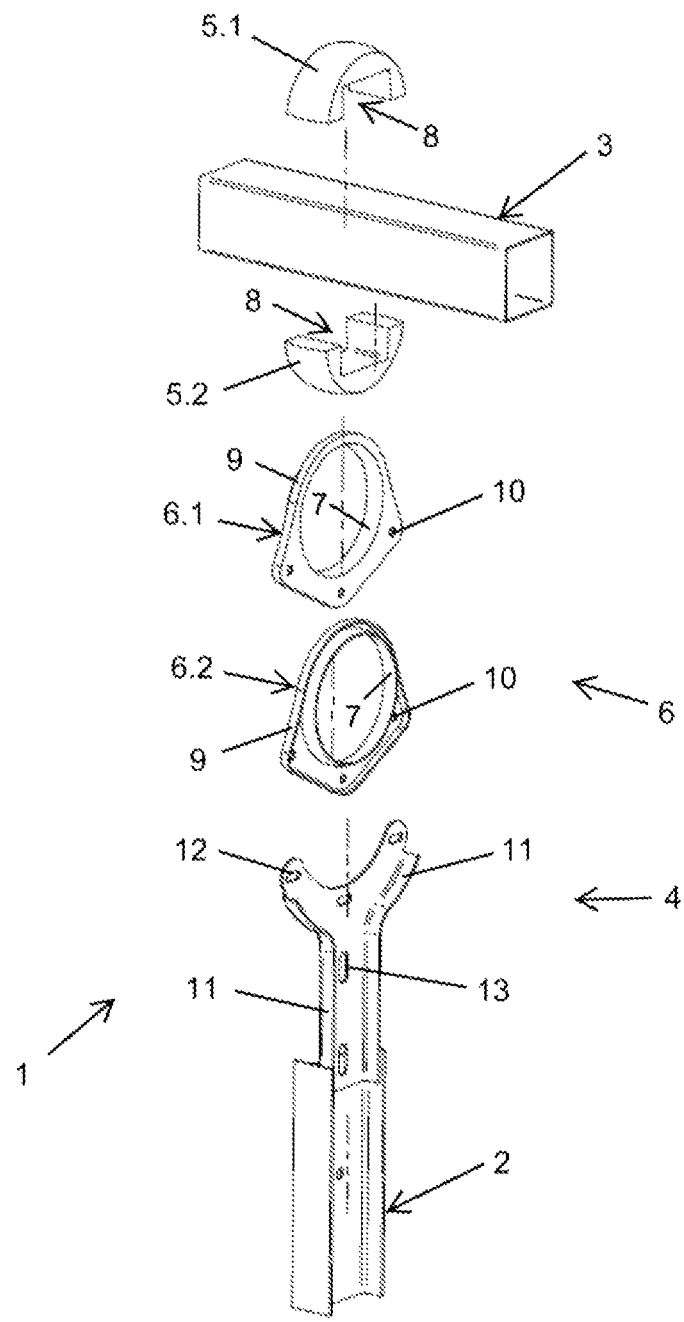
FIG. 1 is an exploded view of a practical exemplary embodiment of a bearing according to the object of the invention.
Figure 2:
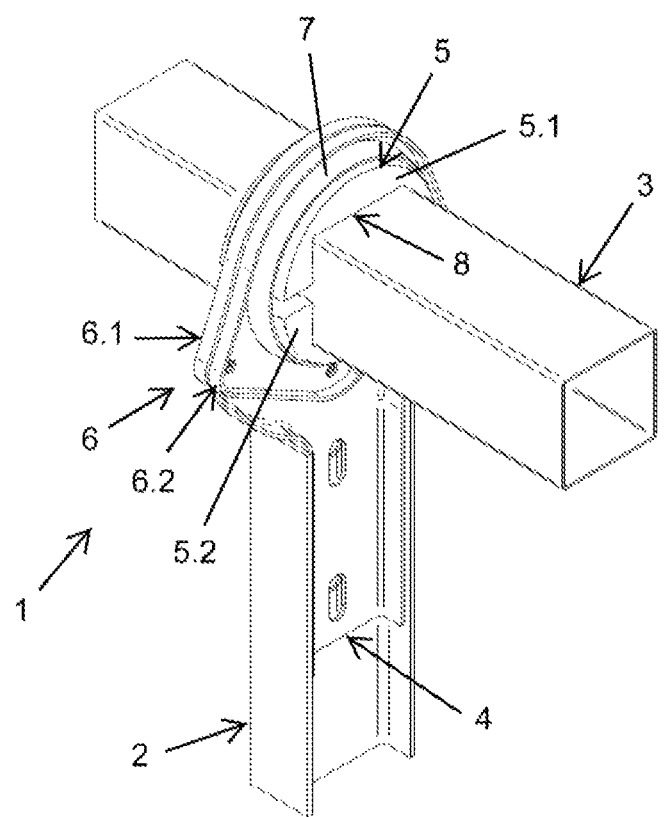
FIG. 2 is a perspective view of the exemplary embodiment of the bearing object of the invention in FIG. 1 mounted on an I-pillar, FIG. 2 representing a rotational shaft of the application passing through the bearing.

As shown in FIG. 1, said bearing (1) object of the invention comprises a metal support (4), which is fixed by screwing or a similar solution to a pillar (2), the aforementioned support (4) being arranged axially clamped between two component parts (6.1), (6.2) of a clamp (6).

The clamp (6) determines a circular ring (7) which is formed in the centre thereof, wherein a ball joint (5) is housed, the rotational shaft (3) passing therethrough in the application assembly.

According to a practical embodiment, the ball joint (5) is made up of two equal sections (5.1), (5.2) which are joined together, thereby determining a spherical surface on the outside thereof that fits on a reciprocal surface inside the ring (7), whereas the inner part the ball joint (5) determines an opening (8) corresponding to the section of the rotational shaft (3) of the application, which thus remains rotationally associated with the ball joint (5) in the functional mounting of the bearing (1).

With this practical embodiment, to assemble the bearing (1) in the application thereof, it is enough to nail the pillar (2) into the ground with an appropriate orientation and to then fix the support (4) to the pillar (2) and incorporate the clamp (6) with the ball joint (5) on the rotational shaft (3), positioning the assembly so that the support (4) is clamped between the two component parts (6.1), (6.2) of the clamp (6) and, once this is done, said component parts (6.1), (6.2) of the clamp (6) are joined.

According to a preferred embodiment, the component parts (6.1), (6.2) of the clamp (6) are formed from shaped sheet metal, said component parts (6.1), (6.2) of the clamp (6) determining the ring (7) by the mere shape of said parts, forming a concave inner surface in accordance with the spherical shape of the outer surface of the ball joint (5), while on the outer contour of each of the parts (6.1), (6.2) a perpendicular wing (9) is determined, reinforcing the mechanical resistance of said sheet metal. On these component parts (6.1), (6.2) of the clamp (6), holes (10) are made for the passage of the axial joining screws for both parts (6.1), (6.2) in the assembly of the clamp (6) on the ball joint (5) and the fastening to the support (4).

Similarly, it is envisaged that the support (4) is made of shaped sheet metal, determining perpendicular wings (11) on the lateral edges which provide mechanical resistance, whereas holes (12) are made in the central area for the passage of the joining screws to join the two component parts (6.1), (6.2) of the clamp (6), and other holes (13) for the passage of screws to fix the support itself (4) to the pillar (2) in the application assembly.

It is envisaged that the support (4) and the clamp (6) are preferably made of sheet metal, but they could also be made of other materials that provide a suitable resistance, without impairing the functionality of the invention.

Where appropriate, it is envisaged that the ball joint (5) is made of a plastic material to lessen the friction of the functional rotation with respect to the clamp (6), but it could also be made of other materials that have anti-friction qualities, complying with the object of the invention.

It is envisaged that the fastening between the support (4) and the pillar (2), and between the clamp (6) and the support (4) are preferably carried out by screwing, facilitating the assembly and disassembly, but other fastening means can be used without altering the essence of the invention.

The invention claimed is:

1. A bearing for rotational shafts supported by support pillars comprising:

a rotational shaft and a support pillar, to establish a fastening between the rotational shaft and the support pillar, able to rotate freely;

a support which is fixed to the support pillar, said support being axially clamped between two component parts of a clamp, which determines a ring that houses a ball joint, through which the rotational shaft being fastened is arranged.

2. The bearing for rotational shafts supported by support pillars according to claim 1, wherein the ball joint is made up of two complementary sections which are joined to each other, determining a spherical surface on the outside thereof in correspondence with an inner reciprocal surface of the ring of the clamp, and an opening on the inside in correspondence with the section of the rotational shaft to be fastened.

3. The bearing for rotational shafts supported by support pillars according to claim 1, wherein the component parts of the clamp have holes for a passage of screws for joining said parts together.

4. The bearing for rotational shafts supported by support pillars according to claim 1, wherein the support has holes for the passage of the joining screws to join the two component parts of the clamp, and other holes for the passage of screws for the fastening thereof to the pillar.

5. The bearing for rotational shafts supported by support pillars according to claim 1, wherein the two component parts of the clamp have a perpendicular reinforcing wing on an outer contour thereof.

6. The bearing for rotational shafts supported by support pillars according to claim 1, wherein the support has perpendicular reinforcement wings on a plurality of lateral edges.

7. The bearing for rotational shafts supported by support pillars according to claim 1, wherein the two component parts of the clamp and/or the support are made of sheet metal.

8. The bearing for rotational shafts supported by support pillars according to claim 1, wherein the ball joint comprises first and second sections that are joined without fasteners.

9. The bearing for rotational shafts supported by support pillars according to claim 8, wherein the two component parts include a first component part having a first circular opening corresponding to a shape of the ball joint when the first and second sections are joined together and a second component part having a second circular opening corresponding to the shape of the ball joint when the first and second sections are joined together.

10. The bearing for rotational shafts supported by support pillars according to claim 1, wherein each of the two component parts is connected to the support.

11. The bearing for rotational shafts supported by support pillars according to claim 1, wherein the support is disposed between the two component parts, wherein:

the support has a first side and a second side opposite the first side;

the two component parts include a first component part and a second component part;

the first component part is attached to the first side of the support; and the second component part is attached to the second side of the support.

* * * * *